US00RE38530E

(19) United States
(12) Reissued Patent
Willems et al.

(10) Patent Number: US RE38,530 E
(45) Date of Reissued Patent: Jun. 8, 2004

(54) ANTI-STATIC RESIN COMPOSITION CONTAINING FLUORINATED PHOSPHONIUM SULFONATES

(75) Inventors: Johannes Gerardus Henricus Willems, Bergen op Zoom (NL); Theodorus L. Hoeks, Bergen op Zoom (NL)

(73) Assignee: General Electric Company, Schenectady, NY (US)

(21) Appl. No.: 10/376,923

(22) Filed: Feb. 27, 2003

Related U.S. Patent Documents

Reissue of:
(64) Patent No.: 6,194,497
Issued: Feb. 27, 2001
Appl. No.: 08/899,025
Filed: Jul. 23, 1997

(51) Int. Cl.[7] ..... C08K 5/42
(52) U.S. Cl. ..... 524/154; 524/912
(58) Field of Search ..... 524/154, 912

(56) References Cited

U.S. PATENT DOCUMENTS

| | | | | | |
|---|---|---|---|---|---|
| 3,442,854 | A | * | 5/1969 | Curtius et al. | 528/198 |
| 4,005,057 | A | * | 1/1977 | Singh et al. | 524/912 |
| 4,038,258 | A | * | 7/1977 | Singh et al. | 524/912 |
| 4,093,589 | A | * | 6/1978 | Factor et al. | 524/159 |
| 4,943,380 | A | * | 7/1990 | Sugiura et al. | 524/154 |
| 5,021,473 | A | * | 6/1991 | Macholdt et al. | 524/154 |
| 5,051,330 | A | * | 9/1991 | Alexandrovich et al. | 430/108 |
| 5,112,558 | A | * | 5/1992 | Knobel | 524/165 |
| 5,187,214 | A | * | 2/1993 | Govindan | 524/157 |
| 5,449,709 | A | * | 9/1995 | Imae et al. | 524/154 |
| 5,468,793 | A | * | 11/1995 | Ward et al. | 524/159 |
| 5,468,973 | A | * | 11/1995 | Harada et al. | 361/170 |
| 5,486,555 | A | * | 1/1996 | Hirata et al. | 524/912 |
| 5,494,952 | A | * | 2/1996 | Hirata et al. | 524/154 |
| 5,668,202 | A | * | 9/1997 | Hirata et al. | 524/912 |
| 6,090,907 | A | * | 7/2000 | Saito et al. | 528/198 |

FOREIGN PATENT DOCUMENTS

| | | | |
|---|---|---|---|
| EP | 0 170 529 | * | 2/1986 |
| EP | 0 230 907 | * | 8/1987 |
| EP | 0 246 825 | * | 11/1987 |
| EP | 0 309 622 | * | 4/1989 |
| JP | 1-178554 | * | 7/1989 |
| JP | 7-188539 | * | 1/1995 |
| JP | 8302165 | * | 11/1995 |

OTHER PUBLICATIONS

European Search Report for Application No. EP 98 30 5803, Jan. 1998.*

* cited by examiner

*Primary Examiner*—Peter Szekely
(74) *Attorney, Agent, or Firm*—Oppedahl & Larson LLP

(57) ABSTRACT

An anti-static thermoplastic resin composition of 90–99.95 weight % of a thermoplastic resin and correspondingly 10 to 0.05 weight % of a halogenated carbon sulfonic acid salt of a polysubstituted phosphonium compound such as a fluorinated phosphonium sulfonate and wherein the thermoplastic resin is either an aromatic polycarbonate, polyetherimide, polyester, polyphenylene ether, polyphenylene ether/styrene polymer blend, polyamide, polyketone, acrylonitrile-butadiene-styrene, blends thereof and blends thereof with other materials. Preferably the thermoplastic resin is a transparent aromatic polycarbonate.

44 Claims, No Drawings

ANTI-STATIC RESIN COMPOSITION CONTAINING FLUORINATED PHOSPHONIUM SULFONATES

Matter enclosed in heavy brackets [ ] appears in the original patent but forms no part of this reissue specification; matter printed in italics indicates the additions made by reissue.

FIELD OF THE INVENTION

This invention is related to an anti-static resin composition particularly transparent resins compositions comprising a thermoplastic polymer and a halogenated carbon sulfonic acid salt of a polysubstituted phosphonium compound and to a halogenated carbon sulfonic acid salt of a polysubstituted phosphonium compound.

BACKGROUND OF THE INVENTION

Many polymers or blends of polymers are relatively non-conductive. As such, this can result in a static charge build-up during processing and use of the polymer. The charged polymer molded parts can attract dust, which are small particles, and can thus interfere with a smooth surface appearance. The attracted particles to the surface of a molded article may also cause a decrease in the transparency of the article. In addition, the electrostatic charge can be a serious obstacle in the production process of such polymers. In the past, electrically conductive agents such as carbon and metallic particles or surfactants were used in various attempts to reduce electrostatic charges of synthetic macromolecular materials by mixing them internally together or by coating the material with an agent. These methods employing electrically conductive agents are not generally feasible for many reasons such as the large amount of agents which must be usually used, the difficulty in adding them to the material, the difficulty in obtaining a transparent product or retention of mechanical and rheological properties, if that is the case, and the high cost of such conductive agents. Thus, these agents can be used only in limited situations.

Anti-static agents are materials which are added to polymers to reduce their tendency to acquire an electrostatic charge, or when a charge is present, these anti-static agents promote the dissipation of such a charge. The anti-static agents are usually hydrophilic or ionic in nature. When present on the surface of polymeric materials, they facilitate the transfer of electrons and thus eliminate the build up of a static charge. Anti-static agents have been applied in two ways. One method uses external anti-static agents that are applied by spraying the surface or dipping of the polymeric material. The second method uses internal anti-static agents, which are added to the polymer before processing. It is necessary for anti-static agents applied in this manner that they are thermally stable and able to migrate to the surface during processing.

Since there are many anti-static agents having surfactants as their main constituent, appropriate ones may be selected therefrom according to the situation. In fact, many of the types to be internally added have been considered and tried. When used as an internally-applied anti-static agent, however, anionic surfactants are difficult to handle because they are inferior in compatibility and uniform dispersibility and tend to decompose or deteriorate when heated. Cationic surfactants containing quarternary nitrogen in their molecules and amphoteric surfactants, on the other hand, can be used only in limited situations because they are extremely poor in heat resistance, although their anti-static characteristics are good. As for non-ionic surfactants, they are relatively superior to the aforementioned ionic surfactants regarding compatibility with synthetic macromolecular materials, but tend to be weak in anti-static characteristics and their effects disappear with time at normal or high temperatures. Moreover, because of the limited thermal stability of these non-ionic surfactant anti-static agents, their use with engineering thermoplastic resins, such as aromatic polycarbonates, is also limited due to the temperatures at which such resins are processed. Thus, these types of surfactants adversely affect the optical properties of aromatic polycarbonates. Although metal salts of organic sulfonic acids have been reported, especially as internally applied anti-static agents for polycarbonates and polyester resins which are molded at high temperatures, they are not sufficient in compatibility with resins or heat resistance one adverse consequence of insufficient compatibility is that transparency characteristics of certain macromolecular materials such as polycarbonates are lost with such anti-static agents. There has also been a report of using phosphonium salts or organic sulfonic acids having halogen substituent as a flame retardant (U.S. Pat. No. 4,093,589), but they are not to be expected to serve as anti-static agents as well.

Another patent discloses reducing the static charge on polycarbonate resins. This is U.S. Pat. No. 4,943,380, which discloses an anti-static composition containing 90–99.9 weight % of polycarbonate and 0.1–10 weight % of a heat resistant phosphonium sulfonate having the general formula:

(1)

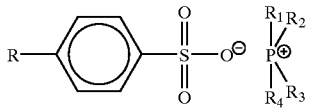

where R is a straight or branched chain alkyl group having from 1 to 18 carbon atoms; $R_1$, $R_2$ and $R_3$ are the same, each being an aliphatic hydrocarbon with 1–18 carbon atoms or an aromatic hydrocarbon group; and $R_4$ is a hydrogen group with 1–18 carbon atoms. The corresponding cationic surfactants containing quarternary nitrogen in their molecules can only be used in limited situations, because they are extremely poor in heat resistance although their anti-static characteristics are good (U.S. Pat. No. 5,468,973).

SUMMARY OF THE INVENTION

It is, therefore, an object of this invention to provide an anti-static resin composition comprising such polymers as polycarbonate, polyetherimide, polyester, polyphenylene ether/polystyrene blends, polyamides, polyketones, acrylonitrile-butadiene-styrene (ABS) or blends of these polymers or blends thereof with other materials or polymers, and a heat resistant anti-static material with which the aforementioned problems of conventional agents can be eliminated.

It is another object of this invention to provide a new anti-static agent which can be internally added to a synthetic resin preferably having transparent characteristics in the molded state without adversely affecting the transparency and mechanical properties of the molded article. However, this invention is not limited to transparent thermoplastics since anti-static requirements are also applicable to pigmented or translucent molded thermoplastic polymer articles.

DETAILED DESCRIPTION OF THE INVENTION

Briefly, it has been discovered, according to the present invention, that relatively small quantities of certain heat resistant substituted phosphonium salts of medium and short chain halogenated fluorocarbon sulfonic acids of about 0.05–10 wt %, preferably about 0.2–1.5 wt %, and more particularly about 0.5–1.5 wt %, can be used as internal anti-static agents in polycarbonate, polyetherimide, polyester, polyphenylene ether/polystyrene blends, polyamides, polyketones, ABS or blends of these polymer resins of about 90–99.95 wt %, preferably about 98.5–99.8 wt % and more particularly about 98.5–99.5 wt %, the weight % based on the total weight of polymer and additive. In general, the substituted phosphonium salts of the medium and short chain sulfonic acids have the general formula:

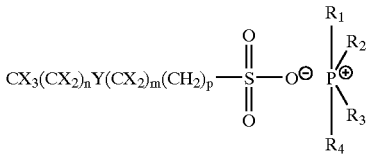

(2)

wherein X is independently selected from halogen or hydrogen provided that at least one (1) X is halogen; n, m and p are integers from 0 to 12; and Y is [zero] *a single bond* or a [heterocyclic atom, other than carbon, of an atomic ring and is either] *heteroatom such as* nitrogen, oxygen, sulfur, selenium, phosphorus, arsenic, and the like; $R_1$, $R_2$, and $R_3$ are the same, each having an aliphatic hydrocarbon radical with 1–8 carbon atoms or an aromatic hydrocarbon radical of 6–12 carbon atoms and $R_4$ is a hydrocarbon radical with 1–18 carbon atoms. The halogens may be independently selected from bromine, chlorine, fluorine and iodine. Preferably, the halogen is fluorine.

The phosphonium sulfonate is preferably fluorinated phosphonium sulfonate and is composed of a fluorocarbon containing an organic sulfonate anion and an organic phosphonium cation. Examples of such organic sulfonate anions include perfluoro methane sulfonate, perfluoro butane sulfonate, perfluoro hexane sulfonate, perfluoro heptane sulfonate and perfluoro octane sulfonate. Examples of the aforementioned phosphonium cation include aliphatic phosphonium such as tetramethyl phosphonium, tetraethyl phosphonium, tetrabutyl phosphonium, triethylmethyl phosphonium, tributylmethyl phosphonium, tributylethyl phosphonium, trioctylmethyl phosphonium, trimethylbutyl phosphonium trimethyloctyl phosphonium, trimethyllauryl phosphonium, trimethylstearyl phosphonium, triethyloctyl phosphonium and aromatic phosphoniums such as tetraphenyl phosphonium, triphenylmethyl phosphonium, triphenylbenzyl phosphonium, tributylbenzyl phosphonium.

The fluorinated phosphonium sulfonate of the present invention can be obtained by any combination of any of these organic sulfonate anions and organic cations but this invention is not limited by the examples given above. Fluorinated phosphonium sulfonate may be produced in a very pure form by mixing the corresponding sulfonic acid and the quarternary phosphonium hydroxide in a solvent mixture followed by evaporation of the solvent mixture. Tetrabutyl phosphonium perfluoro butane sulfonate, for example, can be produced with a yield of about 95% by placing 98.6 g. of perfluoro butane sulfonic acid, 200 ml. of a 40 wt. % solution of tetrabutyl phosphonium hydroxide and a 500 ml of a solvent mixture in a flask, stirring the mixture for one hour at room temperature, isolating phosphonium sulfonate which separates as an oily layer, washing it with 100 ml of water, followed by evaporation of the solvents using a vacuum pump.

As stated the preferred phosphonium sulfonate employed herein is a fluorinated phosphonium sulfonate having the general formula:

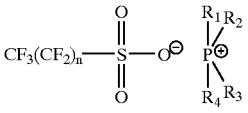

(3)

wherein F is fluorine; n is an integer of from 1–12, S is sulfur; $R_1$, $R_2$ and $R_3$ are the same, each having an aliphatic hydrocarbon radical of 1–8 carbon atoms or an aromatic hydrocarbon radical of 6–12 carbon atoms and $R_4$ is a hydrocarbon radical of 1–18 carbon atoms. Anti-static compositions comprising fluorinated phosphonium sulfonate shown by formula (3) having the principle component thereof can be used in many different ways to make use of their anti-static and compatibility characteristics and heat resistance in providing such anti-static characteristics to polycarbonate, polyetherimide, polyester, polyphenylene ether/polystyrene blends, polyamides, polyketones, ABS or blends of these polymers. The phosphonium fluorocarbon sulfonate salts to this invention are low melting semi-solid materials, and as such, they can be handled as a molten liquid. Some embodiments in the present invention are solid crystalline materials at room temperature (15–25° C.) and are easy to weigh, handle, and add to the polycarbonate, polyetherimide, polyester, polyphenylene ether/polystyrene blends, polyamides, polyketones, ABS or blends of these polymers.

A common way to practice this method is to add the agent directly and to mix it at the time of polymer production or fabrication. It can be processed by conventional means, including extrusion, injection, moulding, compression moulding or casting. The quantity of the phosphonium fluorocarbon sulfonate salt added to polycarbonate, polyetherimide, polyester, polyphenylene ether/polystyrene blends, polyamides, polyketones, ABS or blends of these polymers is an amount effective to reduce or eliminate a static charge and can be varied over a range. It has been found that if too little of the anti-static substituted phosphonium fluorocarbon sulfonate salt is added to the resin, there still may be a tendency for static charge to build up on the article made of the resin. If the loadings of the anti-static additive become too high, the addition of these quantities is uneconomical, and at some level it may begin adversely to affect other properties of the resin. For example, in order to obtain a favorable result by such an internal application method in transparent polycarbonate grades, it is preferable to add an agent of the present invention at the rate of 0.1–1.5 wt % with respect to the molding composition and it is even more preferable to do so at the rate of 0.4–0.8 wt %. Antistats of the present invention are more strongly resistant against heat and can be added in lower quantities than the conventional ionic surfactants, e.g. phosphonium alkyl sulfonates, and the resin compositions have good transparency and mechanical properties.

DETAILED DESCRIPTION OF THE EXAMPLES

This invention can be further described by means of the following Examples. It should be understood, however, that this invention shall in no way be restricted by these Examples. In the Examples where comments are in terms of percent, they are percent by weight.

The following two test procedures were employed to analyze samples for anti-static behavior. These were the Dust Attraction test, static charge measurements and the surface resistivity by static charge measurement.

Dust Attraction Test

Dust attraction in transparent polycarbonate articles was developed. In this procedure, several color plaques are put in an exicator which is saturated with an in situ prepared $NH_4Cl$ dust for 60 minutes. The dust chamber is equilibrated for 1 hour before the samples are inserted. After 1 hour, the samples are removed and pictures of the color plaques together with the reference material are made using a projector lamp as a light source. The plaques are visually analyzed for appearance against a polycarbonate reference plaque containing no anti-static agent.

Surface Resistivity

Surface resistivity measurements were made at 55° C. because at room temperature resistivity values have values in the range of $10^{17}$–$10^{18}$ Ohm, in which range accurate results are difficult to obtain. Therefore, at a temperature of 55° C., resistivity values have values in the range of $10^{13}$–$10^{14}$ Ohm.

In addition to the above tests, the following tests were also conducted:

| | |
|---|---|
| Yellowness Index (YI) | determined in accordance with ASTM 1925-63T. |
| Transparency | determined in accordance with ASTM D-1003. |
| Haze | determined in accordance with ASTM 1925 63T and ASTM D-1003. |
| Melt Volume Rate | determined in accordance with ASTM - 1238. |

EXAMPLE 1

This Example describes the preparation of a fluorinated phosphonium sulfonate of this invention.

Potassium perfluorobutylsulfonate was used as the starting material. The potassium ($K^+$ ion) was first exchanged for a $H^+$ ion using an ion exchange column (Rohm & Haas, Amberjet 1200 H). A second step employed in this procedure was an acid-base reaction using a fluorocarbon tail sulfonic acid and tetra butyl phosphonium hydroxide resulting in a high yield and high purity fluorinated phosphonium sulfonate. The reaction is as follows:

(4)

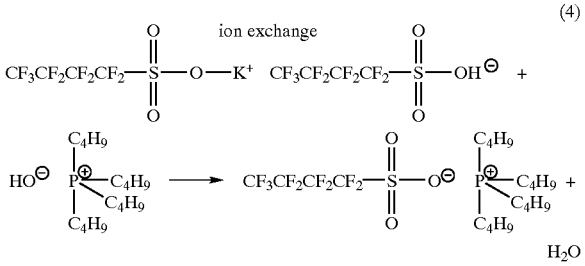

tetrabutylphosphonium nonafluoro-1-butanesulfonate

EXAMPLE 2

This Example describes the preparation of a fluorinated phosphonium sulfonate of this invention.

Potassium nona-fluoro-ethoxyethyl sulfonate was used as the starting material. The potassium ($K^+$ ion) was first exchanged for a $H^+$ ion using an ion-exchange column (Rohm & Haas, Amberjet 1200 H). A second step employed in the procedure was an acid-base reaction using a fluorocarbon tail sulfonic acid and tetra butyl phosphonium hydroxide resulting in a high yield and high purity fluorinated phosphonium sulfonate.

The compound obtained had the following formula:

(5)

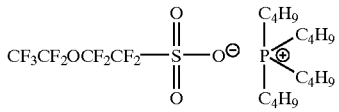

EXAMPLE 3

This example describes the preparation of a fluorinated phosphonium sulfonate of this invention.

Zonyl-TBS (DuPont), which is a mixture of different fluorocarbon containing sulfonic acids and fluorocarbon containing ammonium sulfonates was used as the starting material. The ammonium ($NH^+_4$ was first exchanged for an $H^+$- ion using an ion-exchange column (Rohm & Haas, Amberjet 1200 H). A second step employed in the procedure was an acid base reaction using the mixture of fluorocarbon tail containing sulfonic acids and tetra butyl phosphonium hydroxide. The compound mixture obtained consisted of the following components wherein y is an integer of 1–9.

(6)

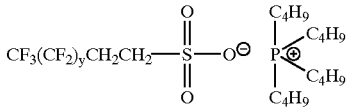

EXAMPLE 4

The anti-static properties of the fluorinated phosphonium sulfonate of Example 1 above was determined by first melt blending with anti-static agent a transparent aromatic polycarbonate resin having an intrinsic viscosity of about 0.46 deciliters per gram (dl/g) as measured in methylene chloride at 20° C. In a twin screw extruder at a temperature of about 285° C., extruded through a die orifice into strands which were quenched in water and then pelletized. The pellets were dried at about 125° C. for about 2 hours. The dried pellets were injection molded into plaques of about 10 cm. square by about 2.5 mm. thick at an injection molding temperature of about 285° C. using a single screw injection molding machine. Obviously, the temperature profile over the injection molding barrel was varied to an ultimate of about 285° C. In this Example, the barrel composition set forth in TABLE 1 below was prepared under the same conditions as set forth above with the polycarbonate content varied with respect to the concentration of the anti-static agent present in each formulation. Each formulation also contained the same quantity of mold release agent, UV absorber, stabilizers, antioxidant and dye, the total of which was about 0.8 wt % of the polycarbonate employed. The results obtained were as follows:

TABLE 1

| Anti-Static Concentration (%) | Surface Resistivity ($10^{14}$ Ohm at 55° C. | Appearance Transparency (%) | Yellowness Index | Yellowness Haze | MVR (1.2 kg./300° C. $cm^3$/10 min. |
|---|---|---|---|---|---|
| 0 | 16.6 | 89.6 | 1.35 | 0.8 | 12.1 |
| 0.2 | 6.13 | 89.4 | 1.30 | 0.9 | 12.4 |
| 0.4 | 7.63 | 89.5 | 1.40 | 1.0 | 12.0 |
| 0.5 | 7.95 | 89.6 | 1.50 | 0.8 | 11.9 |
| 0.6 | 1.74 | 89.5 | 1.60 | 0.7 | 12.1 |
| 0.8 | 0.26 | 89.7 | 1.45 | 0.8 | 12.3 |
| 1.0 | 0.06 | 89.9 | 1.50 | 0.50 | 12.8 |
| 1.5 | 0.004 | 89.0 | 1.70 | 0.65 | 13.6 |

The results clearly show the excellent anti-static properties Of the composition Of this invention as shown by the results of surface resistivity and transparency without affecting transparency or color.

EXAMPLE 5

The formulations Of Example 4 were molded under abusive molding conditions i.e. the molding temperature of Example 4+20° C. and a cooling time of 120 seconds compared to normal cooling time in Example 4 of 20 seconds. The results obtained were as follows:

TABLE 2

| Anti-Static Concentration (%) | Surface Resistivity ($10^{14}$ Ohm at (55° C.) | Appearance Transparency (%) | Yellowness Index | Yellowness Haze |
|---|---|---|---|---|
| 0 | 14.8 | 89.5 | 1.50 | 0.8 |
| 0.2 | 18.8 | 89.4 | 1.40 | 0.85 |
| 0.4 | 11.6 | 89.5 | 1.70 | 1.0 |
| 0.5 | 0.85 | 89.7 | 1.70 | 0.75 |
| 0.6 | 0.33 | 89.6 | 1.75 | 0.85 |
| 0.8 | 0.015 | 89.7 | 1.50 | 0.7 |
| 1.0 | n.d. | n.d. | n.d. | n.d. |
| 1.5 | n.d. | n.d. | n.d. | n.d. |

n.d. - not determined

The results of injection molding of the same samples at different levels using abusive conditions (Temp. +20° C. and cooling time=120 sec instead of 20 sec) are set forth in TABLE 2. Comparison of the results in TABLES 1 and 2 shows that if abusive molding conditions are used, the anti-static additive concentration in order to obtain anti-static polycarbonate is slightly reduced at loadings higher than 0.5%. This is a further indication of the improved surface seeking abilities of the anti-static additive of this invention at even higher processing temperatures. This was also confirmed for parts molded at abusive temperatures (+20° C.) with the normal cycle time (t=20 sec). For samples molded using normal and abusive molding with a cycle time of 20 sec using loadings of 0.6% anti-static concentration, the surface resistivity decreased from 1.74 (TABLE 1) to 0.33 (TABLE 2) respectively. These results clearly show the effect of the molding conditions of the surface resistivity behavior and that the surface seeking ability of the anti-static additive is temperature and cycle time dependent.

EXAMPLE 6

Example 4 was repeated except that the anti-static material employed was EPA-202, a phosphonium sulfonate of the prior art obtained from Takemoto Oil and Fat Co., LTD. The composition of EPA-202 has the following formula and is an anti-static composition of U.S. Pat. No. 4,943,380:

(7)

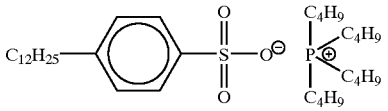

The results obtained were as follows:

TABLE 3

| Anti-Static Concentration (%) | Surface Resistivity ($10^{14}$ Ohm at 55° C. | Appearance Transparency (%) | Yellowness Index | Yellowness Haze | MVR (1.2 kg./300° C. $cm^3$/10 min. |
|---|---|---|---|---|---|
| 0 | 6.47 | 89.6 | 1.35 | 0.8 | 12.07 |
| 0.5 | 6.81 | 87.9 | 2.70 | 2.10 | 16.97 |
| 1.5 | 1.85 | 89.1 | 1.85 | 1.55 | 23.00 |
| 2.0 | 0.30 | 89.4 | 2.05 | 1.15 | 26.71 |
| 1.55[a] | 0.45 | 88.6 | 5.80 | 0.6 | 23.00 |

[a]abusive molding conditions as used in Example 5 above.

It should be noted that the anti-static properties of the anti-static agent of this invention (tetrabutylphosphonium nona-fluoro-1-butanesulfonate Example 1) has better anti-static properties at significantly lower concentration than the anti-static property of the prior art phosphonium sulfonate EPA-202. The lower the surface resistivity the better is the anti-static property of the additive. At 2.0% concentration of the prior art additive, the resistivity is equivalent to just 0.8% concentration of the inventive anti-static additive. Also, it is noted that the EPA-202 is a viscous yellow oil which increases the Yellowness Index while the anti-static additive, Example 1, is a white solid thus facilitating better dispersion of a powder than a viscous oil.

In addition, it is further noted that the melt flow of the composition of the invention is essentially unaffected as determined by MVR. Even at a concentration of 1.5% (TABLE 1) the MVR is only slightly greater than a composition with no additive. In TABLE 3, at a concentration of 1.5% of the prior art anti-static agent, the MVR is almost doubled compared to no additive. This demonstrates that the prior art additive acts as a plastisizer which has a significant negative effect on mechanical properties, particularly aromatic polycarbonate resins.

EXAMPLE 7

A high flow aromatic polycarbonate resin, having an intrinsic viscosity of about 0.42 deciliters per gram as measured in methylene chloride at 20° C., was melt blended and injection molded under the same conditions as employed in Example 4 except that compact disc (CD) blanks were molded.

Three compositions and sets of CD's (10 per composition) were prepared as described above with the polycarbonate content varied with respect to the concentration of the anti-static agent present in the formulation. Each formulation contained the same quantity of mold release agent and stabilizer.

The sample CD blanks were then evaluated for transparency, color and static charge. The static charge was measured directly after molding on each CD blank from employing a calibrated field hand held meter by SIMCO®. The results obtained were as follows:

TABLE 4

| Antistatic concentration (%) | Static Charge (Volts) | Appearance | |
|---|---|---|---|
| | | Transparency | Coloring |
| 0 | 1400 | good | none |
| 0.3 | 800 | good | none |
| 0.5 | 400 | good | none |

The results clearly show that in very high flow grades excellent antistatic properties are obtained without affecting transparency and color.

The formulation containing 0.5% antistatic additive showed no dust attraction in the Dust Attraction Test. The addition of 0.3% antistatic agent showed a large improvement compared to the reference with no anti-static additives.

EXAMPLE 8

The antistatic properties of the fluorinated phosphonium sulfonate of Examples 2 and 3 (Formulas 5 and 6) above were determined by first melt blending with anti-static agent, a transparent aromatic polycarbonate resin having an intrinsic viscosity of about 0.46 deciliters per gram (dl/gm) as measured in methylene chloride at 20° C., in a twin screw extruder at a temperature of about 285° C., extruded through a die orifice into strands which were quenched in water and then pelletized. The pellets were dried at about 125° C. for about 2 hours. The dried pellets were injection molded into plaques of about 10 cm. square by about 2.5 mm. thick at an injection molding temperature of about 285° C. using a single screw injection molding machine. Obviously, the temperature profile over the injection molding barrel was varied to an ultimate of about 285° C. In this Example, the barrel temperature varied from about 20° C. to about 285° C. Each composition set forth in TABLE 5 below was prepared under the same conditions as set forth above with the polycarbonate content varied with respect to the concentration of the anti-static agent present in each formulation. Each formulation also contained the same quantity of mold release agent, UV absorber, stabilizers, antioxidant and dye, the total of which was about 0.8 wt % of the polycarbonate employed. The results obtained were as follows:

TABLE 5

| Anti Static Agent | Concentration Wt. %) | Surface Resistivity ($10^{14}$ Ohm at 55° C.) | Appearance | | |
|---|---|---|---|---|---|
| | | | Transparency (%) | Yellowness | |
| | | | | Index | Haze |
| Control | 0 | 16.6 | 89.6 | 1.35 | 0.8 |
| Example 2 | 0.5 | 8.90 | 89.1 | 1.35 | 1.0 |
| Example 2 | 1.0 | 0.21 | 89.8 | 1.40 | 0.9 |
| Example 3 | 0.5 | 7.74 | 89.2 | 1.45 | 1.1 |
| Example 3 | 1.0 | 0.12 | 89.7 | 1.30 | 1.4 |

As seen from the Examples, the results clearly show a lower surface resistivity of the molded plaques with the anti-static composition of this invention at lower additive loadings compared to prior art EPA-202 described in Example 6. Furthermore, with EPA-202, severe yellowing occurred using abusive molding conditions and this is not observed for the newly synthesized anti-static compositions of this invention. Also noted is that EPA-202 appears to be a plasticizer for polycarbonate as shown by the increase in MVR values while essentially no difference in flow is observed for the fluorinated phosphonium sulfonates of this invention.

In the present invention, it is to be understood by those skilled in the art that various changes may be made in the particular embodiments described above without departing from the spirit and scope of the invention as defined in the appended claims.

What is claimed is:

1. A *method for making a* molded article comprising a thermoplastic resin composition having enhanced antistatic properties [made by the process] *comprising the steps* of adding an effective amount of an antistatic agent to a thermoplastic resin, and mixing together the agent and the thermoplastic resin [at the time of polymer production or fabrication of the molded article by molding] *and molding a molded article from the mixed-together agent and thermoplastic resin*, wherein the antistatic agent has the following formula:

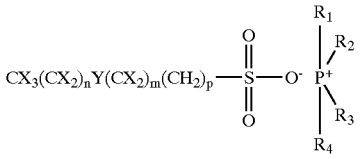

wherein X is independently selected from the group consisting of bromine, chlorine, fluorine, iodine and hydrogen, provided that at least one X is selected from the group consisting of bromine, chlorine, fluorine and iodine; n, *m* and [m] *p* are integers from 0 to 12; *with the proviso that* when p is an integer from 1–12, Y is [zero] *a single bond* or is selected from the group consisting of nitrogen, oxygen, sulfur, selenium, phosphorus and arsenic, and when p is 0, *m is 1 to 12,* Y is selected from the group consisting of nitrogen, oxygen, sulfur, selenium, phosphorus and arsenic; $R_1$, $R_2$ $R_3$ are the same *as each other*, and are selected from the group consisting of an aliphatic hydrocarbon radical of 1–8 carbon atoms and an aromatic hydrocarbon radical of 6–12 carbon atoms; and $R_4$ is a hydrocarbon radical of 1–18 carbon atoms.

2. The method of claim 1, wherein the thermoplastic resin is selected from the group consisting of aromatic polycarbonates, polyetherimides, polyesters, polyphenylene ethers, polyphenylene ether/styrene polymer blends, polyamides, polyketones, acrylonitrile-butadiene-styrenes, and blends thereof.

3. The method of claim 1 wherein the thermoplastic resin composition comprises 90–99.95 weight % of the thermoplastic resin and correspondingly 10–0.05 weight % of the anti-static agent based on the weight of the thermoplastic resin and additive.

4. The method of claim 1 wherein the thermoplastic resin composition comprises about 98.5–99.8 wt % of the thermoplastic resin and about 0.2–1.5 wt % of the anti-static agent.

5. The method of claim 1 wherein the thermoplastic resin composition comprises about 98.5–99.5 wt % and about 0.5–1.5 wt % of the anti-static agent.

6. The method of claim 1 wherein fluorinated-carbon sulfonic acid salt of the polysubstituted phosphonium compound is a fluorinated phosphonium sulfonate compound of the following formula:

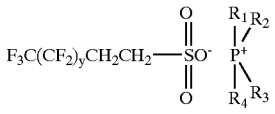

wherein y is an integer of from 1 to 9, $R_1$, $R_2$, and $R_3$ are the same and each are selected from the group consisting [essentially] of an aliphatic hydrocarbon radical of 1–8 carbon atoms and an aromatic hydrocarbon radical of 6–12 carbon atoms, and $R_4$ is a hydrocarbon radical of 1–18 carbon atoms.

7. The method of claim 6 wherein the fluorinated phosphonium sulfonate has the following formula:

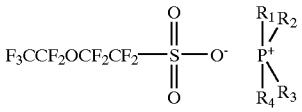

8. The method of claim 6 wherein the thermoplastic resin is selected from the group consisting of aromatic polycarbonates, polyetherimides, polyesters, polyphenylene ethers, polyphenylene ether/styrene polymer blends, polyamides, polyketones, acrylonitrile-butadiene-styrenes, and blends thereof.

9. The method of claim 8 wherein the thermoplastic resin is a transparent aromatic polycarbonate.

10. The method of claim 3 wherein X is fluorine.

11. The method of claim 10 wherein n is 3 and $R_1$, $R_2$, $R_3$ and $R_4$ are each alkyl radicals of $C_4$ carbon atoms, and Y and m are zero.

12. The method of claim 1 in which the article is transparent.

13. The method of claim 12 in which the article is a compact disc blank.

14. The method of claim 1 in which the article is translucent.

15. The method of claim 12 in which the article is pigmented.

16. A molded article comprising a thermoplastic resin composition having enhanced antistatic properties made by the process of adding an effective amount of an antistatic agent to a thermoplastic resin, and mixing together the agent and the thermoplastic resin at the time of polymer production or fabrication of the molded article by molding, wherein the antistatic agent has the following formula:

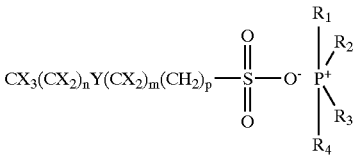

wherein X is independently selected from the group consisting of bromine, chlorine, fluorine, iodine and hydrogen, provided that at least one X is selected from the group consisting of bromine, chlorine, fluorine and iodine; n, *m* and [m] *p* are integers from 0 to 12; *with the proviso* when p is an integer from 1–12, Y is [zero] *a single bond* or is selected from the group consisting of nitrogen, oxygen, sulfur, selenium, phosphorus and arsenic, and when p is 0, *m is 1–2,* Y is selected from the group consisting of nitrogen, oxygen, sulfur, selenium, phosphorus and arsenic; $R_1$, $R_2$ *and* $R_3$ are the same *as each other*, and are selected from the group consisting of an aliphatic hydrocarbon radical of 1–8 carbon atoms and an aromatic hydrocarbon radical of 6–12 carbon atoms; and $R_4$ is a hydrocarbon radical of 1–18 carbon atoms.

17. The article of claim 16 which is transparent.

18. The article of claim 17 which is a compact disc blank.

19. The article of claim 16 which is translucent.

20. The article of claim 16 which is pigmented.

21. The [method] *article* of claim 16 wherein the thermoplastic resin composition comprises 90–99.95 weight % of the thermoplastic resin and correspondingly 10–0.05 weight % of the antistatic agent based on the weight of the thermoplastic resin and additive.

22. The [method] *article* of claim 16 wherein the thermoplastic resin composition comprises about 98.5–99.8 weight % of the thermoplastic resin and corresponding by about 0.2–1.5 weight % of the antistatic agent.

23. The [method] *article* of claim 16 wherein the thermoplastic resin composition comprises about 98.5–99.5 weight % and corresponding by about 0.5–1.5 weight % of the antistatic agent.

24. The [composition] *article* of claim 16 wherein the antistatic agent is a fluorinated phosphonium sulfonate compound of the following formula:

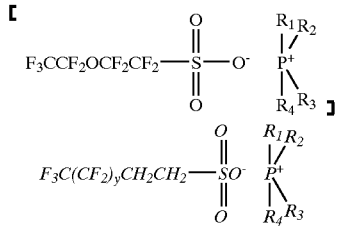

wherein y is an integer of from 1 to 9, $R_1$, $R_2$, and $R_3$ are the same and each are selected from the group consisting [essentially] of an aliphatic hydrocarbon radical of 1–8 carbon atoms and an aromatic [hydrocarbonradical] *hydrocarbon radical* of 6–12 carbon atoms, and $R_4$ is a [hydocarbon] *hydrocarbon* radical of 1–18 carbon atoms.

25. The [composition] *article* of claim 16 wherein the fluorinated phosphonium sulfonate has the following formula:

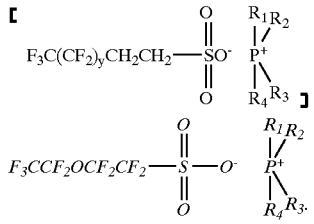

*26. A method for reducing static charge associated with a thermoplastic resin, comprising the step of adding to the thermoplastic resin 0.2 to 1.5 wt % of a thermally stable antistatic agent of the formula*

(2)

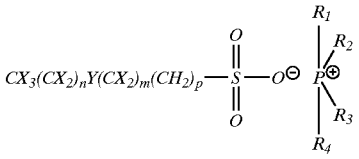

*wherein X is independently selected from fluorine or hydrogen and at least one X equals fluorine, Y is selected from the group consisting of a single bond, nitrogen, oxygen, sulfur, selenium, phosphorus and arsenic, n=0–12, m=1–12, p=0–12; wherein $R_1$, $R_2$, $R_3$ are the same as each other and are selected from the group consisting of an aliphatic hydrocarbon radical of 1–8 carbon atoms and an aromatic hydrocarbon radical of 6–12 carbon atoms; and wherein $R_4$ is a hydrocarbon radical of 1–18 carbon atoms.*

*27. The method of claim 26, wherein the antistatic agent is $CF_3(CF_2)_mCH_2CH_2SO_3^-\ {}^+P(Butyl)_4$ where m=1–9.*

*28. The method of claim 26, wherein the antistatic agent is fluorinated phosphonium sulfonate having the formula:*

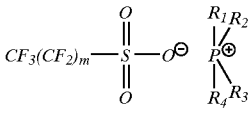

*wherein m is an integer of from 1–12; $R_1$, $R_2$ and $R_3$ are the same as each other and are aliphatic hydrocarbon radical of 1–8 carbon atoms or an aromatic hydrocarbon radical of 6–12 carbon atoms; and $R_4$ is a hydrocarbon radical of 1–18 carbon atoms.*

*29. The method of claim 28, wherein $R_1$, $R_2$, $R_3$ and $R_4$ are selected from the group consisting of methyl, ethyl and butyl.*

*30. The method of claim 29, wherein m is an integer from 3 to 7.*

*31. The method of claim 28, wherein m is an integer from 3 to 7.*

*32. The method of claim 28, wherein the antistatic agent is tetrabutylphosphonium nonafluoro-1-butanesulfonate.*

*33. A thermoplastic resin composition comprising*

*(a) a thermoplastic resin, and*

*(b) 0.2 to 1.5% by weight of the total composition of a thermally stable antistatic agent selected from the formula*

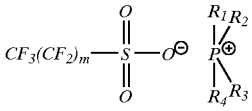

*wherein m is an integer of from 1–12; $R_1$, $R_2$ and $R_3$ are the same as each other and are aliphatic hydrocarbon radical of 1–8 carbon atoms or an aromatic hydrocarbon radical of 6–12 carbon atoms; and $R_4$ is a hydrocarbon radical of 1–18 carbon atoms.*

*34. The composition of claim 33, wherein $R_1$, $R_2$, $R_3$ and $R_4$ are selected from the group consisting of methyl, ethyl and butyl.*

*35. The composition of claim 34, wherein m is an integer from 3 to 7.*

*36. The composition of claim 33, wherein m is an integer from 3 to 7.*

*37. The composition of claim 33, wherein the antistatic agent is tetrabutylphosphonium nonafluoro-1-butanesulfonate.*

*38. The composition of claim 33, wherein the thermoplastic resin consists of aromatic polycarbonates.*

*39. A thermoplastic resin composition comprising*

*(a) a thermoplastic resin, and*

*(b) 0.2 to 1.5% by weight of the total composition of a thermally stable antistatic agent selected of the formula $CX_3(CX_2)_yO(CX_2)_zSO_3^-\ +PR_4$ where every X independently equals F or H and at least one X equals F, y=0–12, z=1–12; three of the four R groups are the same as each other and are selected from the group consisting of aliphatic hydrocarbon radicals of 1–8 carbon and aromatic hydrocarbon radicals of 6–12 carbon atoms; and the fourth R group is a hydrocarbon radical of 1–18 carbon atoms.*

*40. The thermoplastic resin composition of claim 39, wherein the antistatic agent is present in a concentration of 0.5–15% by weight of the total composition.*

*41. The thermoplastic resin composition of claim 40 wherein the antistatic agent is $CF_3CF_2OCF_2CF_2SO_3^-\ {}^+PR4$ and the R groups are selected from the group consisting of methyl, ethyl, and butyl.*

*42. The thermoplastic resin composition of claim 39 wherein the antistatic agent is $CF_3CF_2OCF_2CF_2SO_3^-\ {}^+PR4$ and the R groups are selected from the group consisting of methyl, ethyl, and butyl.*

*43. The thermoplastic resin composition of claim 39, wherein the thermoplastic resin is selected from the group consisting of aromatic polycarbonates, polyetherimides, polyesters, polyphenylene ethers, polyphenylene ether/styrene polymer blends, polyamides, polyketones, acrylonitrile-butadiene-styrenes and mixtures thereof.*

*44. The thermoplastic resin composition of claim 39, wherein the thermoplastic resin consists of aromatic polycarbonates.*

* * * * *